Figure 1:
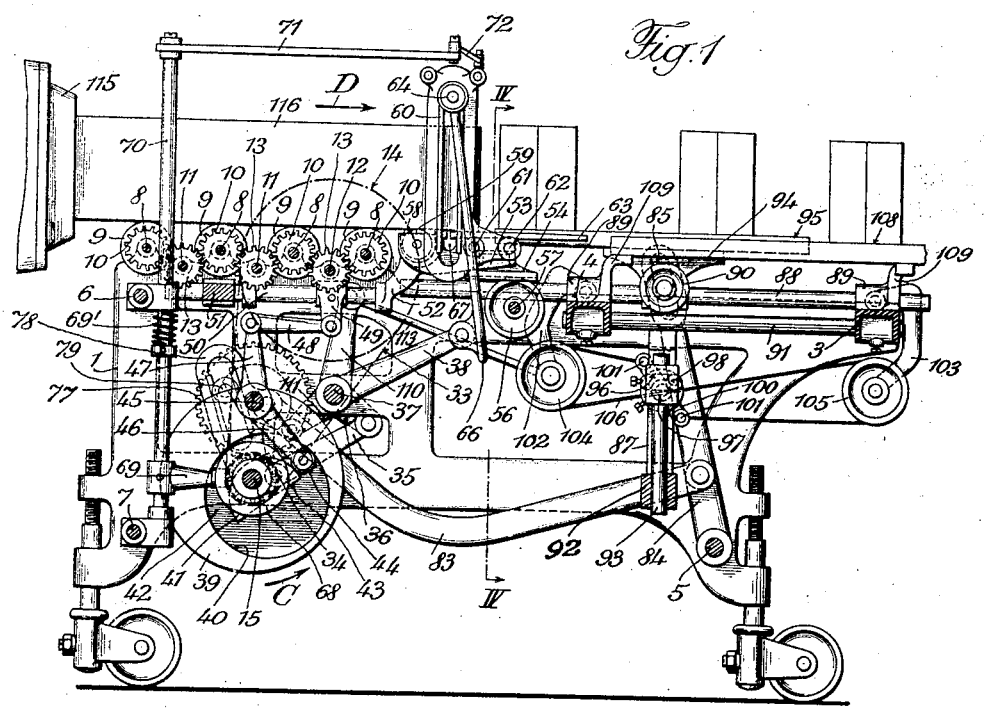

E. FREY.
BLOCK PRESS.
APPLICATION FILED OCT. 7, 1920.

1,399,338.

Patented Dec. 6, 1921.
3 SHEETS—SHEET 1.

Inventor:
Ernst Frey,
By Henry Ortiz
Atty

E. FREY.
BLOCK PRESS.
APPLICATION FILED OCT. 7, 1920.
1,399,338.
Patented Dec. 6, 1921.
3 SHEETS—SHEET 2.
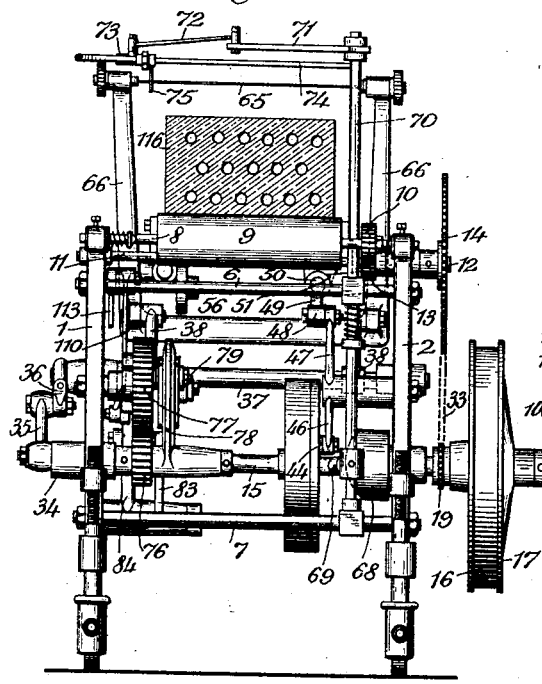
Fig. 3
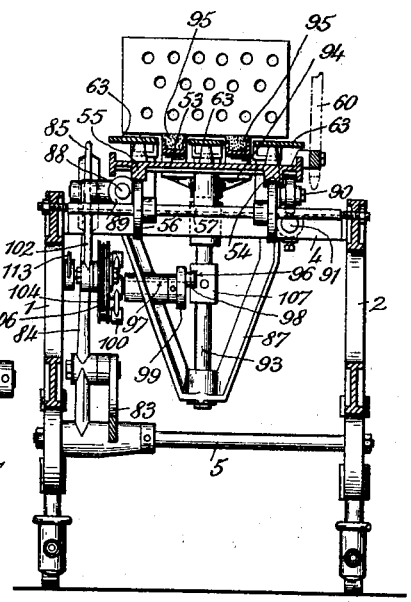
Fig. 4
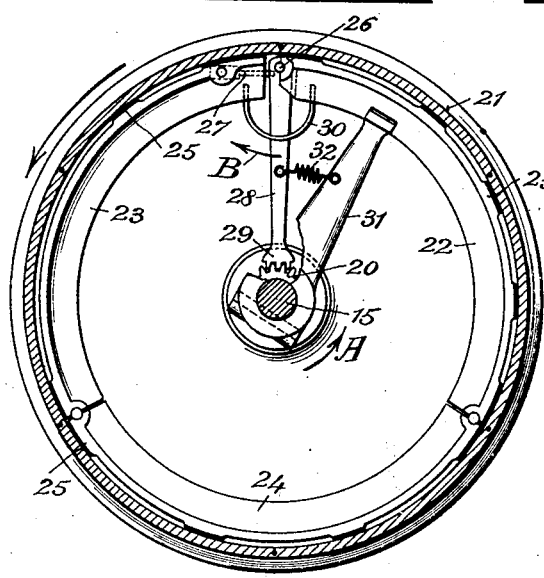
Fig. 5
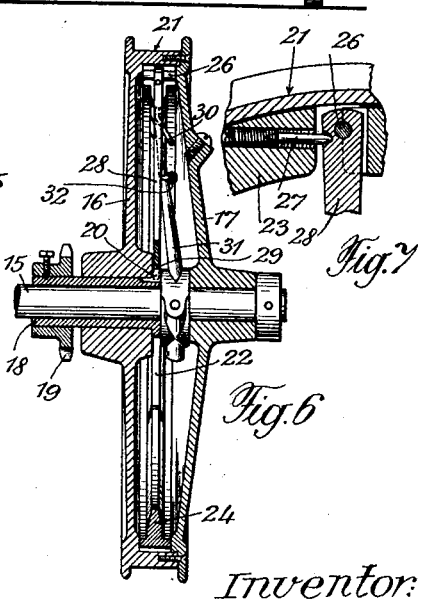
Fig. 6
Fig. 7
Inventor:
Ernst Frey,
Atty.

E. FREY.
BLOCK PRESS.
APPLICATION FILED OCT. 7, 1920.
1,399,338.
Patented Dec. 6, 1921.
3 SHEETS—SHEET 3.
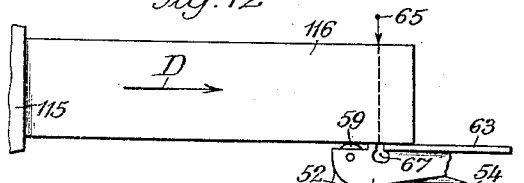
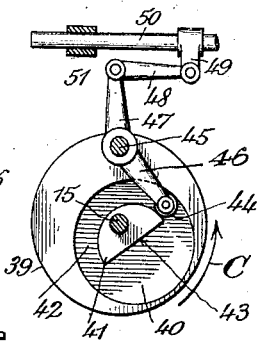
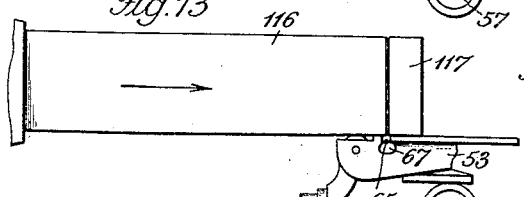
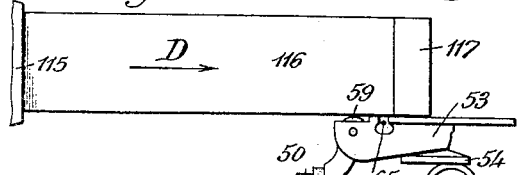
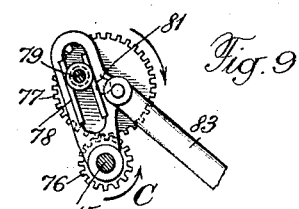
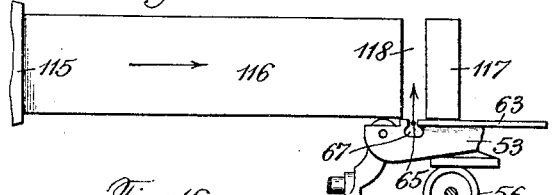
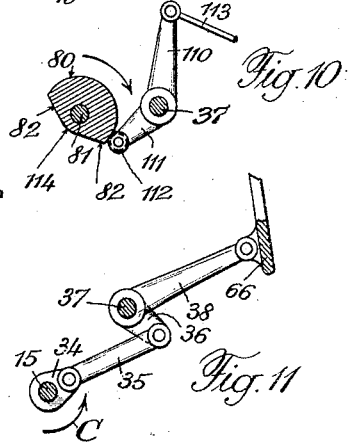
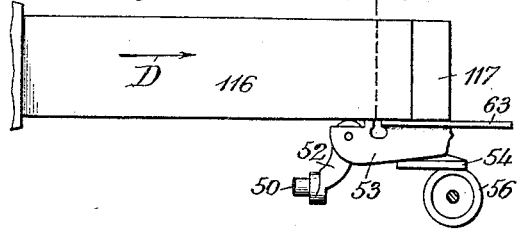
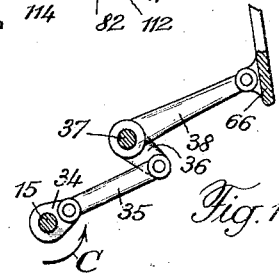
Inventor:
Ernst Frey,
By Henry Orto Jr
Atty.

UNITED STATES PATENT OFFICE.

ERNST FREY, OF CHUR, SWITZERLAND.

BLOCK-PRESS.

1,399,338.   Specification of Letters Patent.   Patented Dec. 6, 1921.

Application filed October 7, 1920. Serial No. 415,343.

*To all whom it may concern:*

Be it known that I, ERNST FREY, a citizen of the Republic of Switzerland, residing at Chur, Turnerwiese, Switzerland, have invented certain new and useful Improvements in Block-Presses; and I do hereby declare the following to be a clear full, and exact description of the invention, such as will enable others skilled in the art to which it appertains to make and use the same, reference being had to the accompanying drawings, and to letters or figures of reference marked thereon, which form a part of this specification.

The present invention relates to improvements in block presses by which the plastic bar expressed through a die in a continuous stream is cut to the required length into single bricks.

With known block presses, the cutting device is arranged on a carriage, which is moved during the cutting action with the speed of the expressed bar and which, after the cutting is completed, is further advanced into a position in which the bricks are removed. The carriage remains for a short time in this front position, during which time the removal of the cut bricks is carried out either by hand or by mechanical means, after which operation the carriage is moved back and the cutting device returns during this return movement of the carriage into its operative initial position and the next cut is effected. The comparatively long travel of the carriage with the cutting device necessitates long intervals between every two subsequent cutting motions, and the velocity of the expressed clay bar is dependent on those intervals. Therefore the output of those known block presses is comparatively small.

The object of the present invention is a block press by which a much greater output is attained than with the hitherto known devices.

According to the invention a carriage supporting the cutting device and the cut bricks is moved from the bar only such a distance that through the gap thus produced the cutter, which has been meanwhile moved away from the cutting surface, is brought back into its initial operative position. Further a special device for removing the cut bricks is provided which effects said removal independently of the position of the cutting device.

Figure 2:
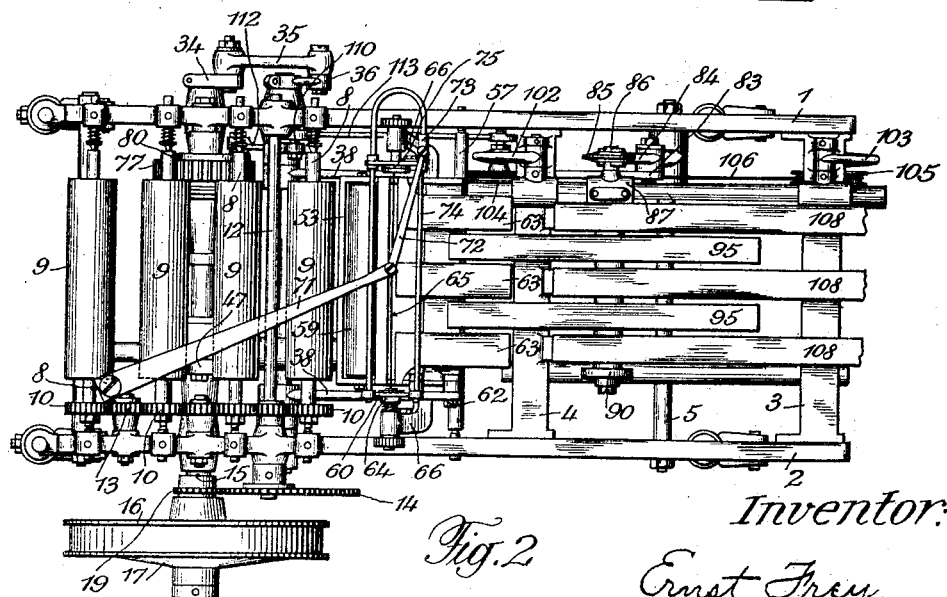

An exemplification of the invention is illustrated on the accompanying drawings, in which:

Figure 1 is a side view,
Fig. 2 is a plan view and
Fig. 3 an end elevation of the cutting apparatus;
Fig. 4 is a section along line IV—IV of Fig. 1.
Figs. 5–7 illustrate a device for transmitting the driving power to a driving shaft.
Figs. 8–11 show constructional details and
Figs. 12–16 illustrate same parts of the device in different subsequent working positions.

Referring to the drawings, 1 and 2 denote two side frames connected together by traverses 3 and 4 and by means of bolts 5, 6 and 7. The whole frame thus produced is supported on rollers.

A number of shafts 8 (four such shafts are shown in the drawings) are rotatably mounted in the side shields; the shafts are provided with smoothly turned rollers 9 made of gypsum or the like, all of these rollers being of the same diameter. The axis of all the shafts 8 are arranged in one horizontal plane. Spur-gear wheels 10 are fixed to one end of the shafts 8. Below the shafts 8 a number of shafts 11, 12 (in the example illustrated two shafts 11 and one shaft 12 are shown) are arranged in a horizontal plane, the one end of said shafts are provided with spur gear wheels 13 engaging with the spur gear wheels 10. The shaft 12 extends over the whole width of the machine and is fitted at its other end with a chain wheel 14.

Further a driving shaft 15 is rotatably mounted in the side shields. To one end of said driving shaft a casing forming a belt pulley and consisting of two disks 16, 17 (Figs. 5, 6) bolted together is loosely mounted. A sleeve 18 is rotatably mounted on said shaft and is operatively connected at its one end with a chain wheel 19, and carries at its other end (within the casing 16, 17) a toothed segment 20. The disk 16 is provided with a cylindrical part 21 serving to take up a belt (not shown in the drawings) by which driving power is transmitted to the machine.

Inside the casing 16, 17 a coupling ring composed of three parts 22, 23 and 24 and provided with facings 25 is arranged, which facings are in frictional contact with the inner surface of the cylindrical part 21. The outer parts 22 and 23 are linked to the middle part 24; a pin 26 (Fig. 7) is fixed in the outer part 22 of the ring and an axially displaceable pin 27 is mounted in the other outer ring segment 23. A lever 28 swings around pin 26 as fulcrum and is arranged in a substantially radial direction, the inner end of said lever being provided with a toothed part 29 co-acting with the toothed segment 20. Between the two other parts 22, 23 of the coupling ring a stirrup shaped spring 30 is interposed, which tends to bring the parts 22, 23 to each other.

An arm 31 is fixed to the driving shaft 15 inside the casing 16, 17, which arm projects into a recess provided in part 22, thus transmitting the rotation of the ring 22, 23, 24 to the driving shaft 15. The arm 31 is connected to the lever 28 by means of a spiral spring 32.

The chain wheels 14 and 19 are operatively connected by means of a chain 33.

To the one end of the driving shaft 15 (the left end in Fig. 3) a crank 34 is fixed which is linked by means of a connecting rod 35 to the one arm 36 of a bell crank lever rotatably mounted on a shaft 37 placed on bearings in the frame; 38 denotes the other arm of said bell crank lever.

To the driving shaft 15 a disk 39 is further secured, which is provided with a cylindrical recess 40 arranged eccentrically to shaft 15 and with a cam 41 of the shape of a semicylinder within said recess, whereby an annular recess 42 and a recess of the shape of a semi-circle are formed, the latter being partly outlined by the flat part 43 of the cam 41. The roller 44 is inserted into the annular recess 42; the roller 44 being arranged at one end of a bell crank lever 46, 47 rotatably mounted on the shaft 45 carried on the frame. The other end of the bell crank lever 46, 47 is linked to a connecting rod 48, which is connected to the arm 49 of a rod 50 displaceably arranged in the axial direction in a guide member 51.

To the right hand end (Fig. 1) of rod 50 an arm 52 of the carriage 53 is fixed; the carriage being fitted with supporting beams 54, 55 by means of which it can roll forward and backward on rollers 56 mounted on a shaft 57 rotatably fitted to the frame. The carriage 53 is provided with a trough 58 containing a moistening roller 59 and with a guide frame 60 secured to the carriage by means of bolts 61 and 62. The carriage 53 is further provided with three supporting faces 63 arranged in a horizontal plane. The lateral walls of the carriage are provided with recesses 67 below the supporting faces 63. The horizontal plane in which the supporting faces 63 are arranged is at the same elevation as the uppermost apex lines of the rollers 9 and 59.

A sliding block 64 is adapted to move up and down in the guide frame 60. To the ends of the lever arms 38 two rods 66 are linked, the other end of one of said rods 66 being pivotally connected to the sliding block 64. The ends of the two rods 66 are provided with devices for clamping the cutting wire 65. The opening of the guide frame 60 extends so far downward that the cutting wire 65 can enter the recesses 67 provided on the carriage.

To the driving shaft 15 a cam disk 68 is further fixed against which a horizontal lever 69 bears continuously through the action of a spring $69^1$. The lever 69 is fixed to a vertical rod rotatably mounted in bearings secured to the transverse bolts 6 and 7. The cam disk 68 is so formed that the rod 70 is carrying out a quick turning motion in one direction and returns thereafter into its initial position every time when the sliding block 64 has reached its highest operative position in the guide frame 60. The rod 70 is carrying at its upper end a horizontal swinging lever 71 to which a second swinging lever 72 is linked; the free end of the latter is provided with a sleeve 73 adapted to slide along a horizontal guide facing 74 secured to the upper end of guide frame 60. The sleeve 73 is fitted with bifurcated scraper 75 that opens toward the bottom and projects over the cutting wire.

A toothed wheel 76 (Fig. 3) is fitted to the driving shaft 15 and co-acts with a larger toothed wheel 77 fixed to the shaft 81. The ratio of the wheel 66 and 77 is an integer, for instance 2:1. On the driving shaft 15 a one-armed lever 78 (Figs. 3 and 9) is rotatably mounted along the slot of which lever a pivot 79 eccentrically fixed in a toothed wheel 77 can be displaced. The gear wheel 77 is integral with a cam disk the part 80 of which extends through an angle of approximately 195° concentrically to the shaft 81, which cam disk is further outlined by two eccentrically arranged flat parts 82 and a concentric part 114 near the shaft 81, the part 114 extending through an angle of approximately 45° (Fig. 10).

The lever arm 78 is linked to a rod 83 and the latter is connected to a lever 84 mounted on bolt 5 and which is provided at its upper end with a slot 85 (Figs. 1, 2 and 9). Within said slot a pinion 86 is sliding which is integral with a vertical frame 87, the latter being of V shape and supported on one side by means of a horizontal shaft 88 slidably mounted in bearings 89 secured to the traverses 3 and 4. The frame 87 is supported on the other side by a roller 90 fitted to said frame and adapted to roll along a fixed bar 91.

A vertical shaft 93 displaceably arranged in its axial direction is taken up by a bearing 92 fixed to the frame 87 but not supported by a foot step bearing. At the upper end of the shaft 93 a supporting piece 94 provided on which a pair of channel irons, the channels of which are filled up with gypsum, are fixed, whereby flat supporting faces 95 are formed. The supporting faces 95 are so shaped and arranged with regard to the supporting faces 63 that the former are arranged in interstices between the latter.

The shaft 93 carries a fixed sleeve 107 provided on one side with a horizontal groove 96. In one shank of the V-shaped frame 87 a horizontal shaft 97 is rotatably mounted, to the one end of which a disk 99 provided with an eccentrically arranged pin 98 entering into the groove 96 is fixed and to the other end a two armed rocking lever 100 is rigidly secured provided at its ends with eyes 101.

To the two traverses 3, 4 two swinging levers 102, 103 are rotatably mounted which levers carry cord pulleys 104 and 105 respectively.

A cord 106 is slung around the cord pulleys 104 and 105 in the manner illustrated in Fig. 1 and the two ends of the cord are fastened to the two eyes 101 of the rocking lever 100. The length of the cord is so chosen that the cord is always tightened by the action of the pin 98 influenced by the weight of parts 93, 94 and 95, which action tends to turn the two armed lever 100 in a clockwise direction. If the parts mentioned above are not influenced by any other forces, the upper plane of the supporting faces 95 is situated below the plane of the three fixed supporting faces 108, the latter being fixed to the traverses 3, 4 by means of brackets 109, the upper plane of said fixed faces 108 being in one horizontal plane with the supporting faces 63 of the carriage 53.

On the shaft 37 a bell crank lever 110, 111 (Figs. 1 and 10) is further rotatably mounted, the one arm 111 carrying a roller 112 which bears against the cam disk 80, whereas the second arm, 110, is connected by means of a rod 113 to the axle of the cord pulley 104. The different parts are arranged such that in any position of roller 112 the latter is pressed against the cam disk 80, 82.

115 denotes the mouthpiece or die of the block press through which the bar 116 is pressed; the lower face of the bar being in one plane with the uppermost part of the rollers 9.

The method of working of the above described device is as follows:

The expressed bar 116 imparts rotation to the rollers 9 by friction action, which rotation is transmitted by the members 10, 13, 14, 33, 19 to the sleeve 18. This rotation occurs in the direction of arrow A in Fig. 5, whereby the lever 28 is displaced by means of the toothing 20, 29 in the direction of arrow B, thus the coupling ring 22, 23, 24 being expanded and neared to the inner circular face of ring 21. The coupling ring 22, 23, 24 is coupled by friction action to the rotating casing 16, 17, a certain slip between the ring and the casing taking place. Thereby the movement is transmitted from the casing 16, 17 to the driving shaft 15, the sleeve 18 and the driving shaft rotating with the same angular speed and all the members which are actuated by the driving shaft 15 are consuming the power of an outside source acting on the transmission member formed by the casing 16, 17. This drive is, however, carried out dependent on the movement of sleeve 18 i. e. on the movement of the bar 116, which causes the movement of sleeve 18. The velocity of this movement is not constant and the variations thereof are transmitted to the driving shaft 15 in order to cause the members of the device to work with a velocity that corresponds to that of the expressed bar. This effect is attained by the regulating mechanism inside the casing 16, 17 in the following manner:

If the velocity of the bar 116 or of the sleeve 18 respectively drops, the lever 28 is turned in the opposite direction to that indicated by arrow B and the coupling ring 22, 23, 24 is thereby loosened, so that the slip between the casing 16, 17 and the coupling ring is increased, whereby the velocity of the latter and of the driving shaft drops correspondingly. If, on the contrary, the velocity of the bar or of the sleeve 18 respectively increases, the lever 18 is turned in the direction of arrow B and the coupling ring is pressed against the inner face of the casing rim 21 so that the slip is decreased in a corresponding manner. Thereby the velocity of the coupling ring and of the driving shaft is increased.

The movements of the carriage and of the cutting wire are carried out in the following manner:

In the position of the carriage 53 shown in Fig. 12, the bar is in such a position relatively to the carriage, that cutting wire 65 which moves forward and backward with the carriage is at a distance from the free end of the bar that corresponds to the width of a brick, i. e. to the amount of movement of the bar during one revolution of the driving shaft 15. The roller 44 enters upon the turning of the driving shaft 15 in the direction of arrow C into the recess 40, in which recess the roller is not positively guided and the carriage can be moved forward in the direction of arrow D by the expressed bar. The cutting wire is moving downward in consequence of the action of the members 34, 36, 38. After the carriage together with the bar upon a turning of the driving shaft through an angle of approximately 100° has been moved forward by a certain amount, the wire 65 has cut the bar and has entered into the recesses 67 provided in the lateral walls of the carriage (Fig. 13).

The roller 44 is then coming in contact with the flat part 43 of the cam 41, the carriage is moved back by the action of said roller and cam driving a short time, (i. e. during a turning of the driving shaft through an angle of approximately 15°) whereby the gap caused by the cutting wire is closed. The carriage is now in the position illustrated in Fig. 14.

The roller 44 has now entered the annular groove 42 and is positively displaced by said groove, whereby the carriage is, during the turning of the driving shaft through an angle of approximately 100°, quickly moved forward by such a distance that between the cut off brick 117 and the bar 116 a gap 118 is produced.

The roller 44 is now in engagement with that part of the annular recess 42 that is approximately concentrical to the shaft 15 and the carriage is moved very slowly forward and then backward. During the aforementioned quick forward movement of the carriage the cutting wire has started its upward movement and is now moving freely through the gap 118 during that slow forward and backward movement of the carriage, without coming into touch with the material, so that after the carriage has finished its slow forward and backward movement (corresponding to a turning of the driving shaft of approximately 45°) the cutting wire is above the bar (Fig. 15).

The roller 44 is now in engagement with that part of the annular recess 42 which has a great eccentricity (during a further turning of the driving shaft through an angle of approximately 100°) so that the carriage returns quickly into its initial position (Fig. 16), the driving shaft is also in the initial position and the above described movements are repeated.

After the driving shaft has made two revolutions two bricks are cut off the bar and stand close to each other upon the supporting faces 63 of the carriage. The pinion 79 of the gear wheel 77 takes up the position shown in Fig. 1 after every two revolutions of the driving shaft 15, while after the first revolution of the shaft 15 the slotted link 78 and the frame 87 have reached the end of their movement toward the right. In this movement the roller 112, which previous to it has been bearing against the concentric part 80 and has remained stationary, comes to bear on the flat part 82 of the cam disk 80, 82, 114 and, as the bell crank lever 110, 111 is continuously weight loaded through the swinging arm 102, the bell crank lever has been turned so that the swinging arm 102 is able to swing toward the right, whereupon the pin 98 is lowered and a lowering of the part 94 and of the supporting faces 95 to an elevation somewhat below the plane of the fixed supporting faces 108 is caused. The bricks resulting from the preceding working period which have been resting on the supporting faces 95 are now lowered onto the supporting faces 108 in the manner above described. Simultaneously the slotted link 78 and the frame 87 have started their movement toward the left.

After a turning of the shaft 81 through an angle of 90° the roller 112 is bearing against the part 114 and remains stationary for some time. During the last quarter of one revolution of shaft 81, by which the roller is brought into the position shown in Fig. 10 and after the slotted arm 78 has finished its movement toward the left, the roller 112 is in engagement with the second flat part 82, whereby the roller 112 is pressed downward, the swinging arm 102 is turned toward the left and the two-armed lever 100 together with pin 98 is turned in an anticlockwise direction and the part 94 is lifted.

In their extreme position toward the left the end of the supporting faces 95 is situated below the supporting faces 63 of the carriage, so that the stones standing on the latter are lifted off. The position is shown in Fig. 1.

Upon a further rotation of shaft 81 the part 94 remains at the same elevation whereas the frame 87 is moved toward the right until the roller 112 engages with the flat part 82 whereupon a lowering of part 94 and a putting down of the bricks onto the fixed supporting faces 108 is effected.

It is evident that with a ratio of 3:1 of the gear wheels 77 and 76 the frame is moved below the supporting faces of the carriage after the driving shaft has performed three revolutions and three bricks are placed together on said supporting faces.

During every revolution of the driving shaft 15 the lever 69 is actuated once whereby the bifurcated scraper 75 slides along the cutting wire as soon as the latter has reached its uppermost position, shifting the material sticking to the wire toward the end of the latter from where it can be removed.

I claim:

1. In an apparatus for cutting bricks, tiles and the like, means to support a plastic bar on being expressed through a die, a cutting device with one cutting member, means to operate said cutting device, a carriage upon which said cutting device is mounted adapted to move with the same speed as the expressed bar during the cutting action, means to impart motion to said carriage for shifting every element severed from said bar after the cutting action is completed to form a narrow gap between said element and the bar, means to return the cutting device through said gap into the operative position, and means to remove the severed element from the carriage.

2. In an apparatus for cutting bricks, tiles and the like, means to support a plastic bar on being expressed through a die, a cutting device with one cutting member, means to operate said cutting device, a carriage upon which said cutting device is mounted adapted to move with the same speed as the expressed bar during the cutting action, means to impart motion to said carriage which motion includes moving the cutting device toward the bar to shift the former away from the plane of cutting, moving the carriage in the opposite direction to shift every element severed from the bar to form a narrow gap between said element and the bar, means to return the cutting device through said gap into the operative position and means to remove the severed elements from the carriage.

3. In an apparatus for cutting bricks, tiles and the like, means to support a plastic bar on being expressed through a die, a cutting device with one cutting member, means to operate said cutting device, a carriage upon which said cutting device is mounted to move with the same speed as the expressed bar during the cutting action, means to impart motion to said carriage which motion includes moving the cutting device toward the bar to shift the former away from the plane of cutting, moving the carriage in the opposite direction to shift every element severed from the bar to form a narrow gap between said element and the bar, means to return the cutting device through said gap into the operative position, means to remove the element severed from the bar from the carriage, a driving shaft adapted to actuate the aforementioned means, and a device for influencing the speed of the driving shaft in accordance with the variations of the speed of the expressed bar.

4. In an apparatus for cutting bricks, tiles and the like, means to support a plastic bar on being expressed through a die, a cutting device with one cutting member, means to operate said cutting device, a carriage upon which said cutting device is mounted adapted to move with the same speed as the expressed bar during the cutting action, means to impart motion to said carriage for shifting every element severed from said bar after the cutting action is completed to form a narrow gap between said element and the bar, means to return the cutting device through said gap into the operative position, and means to remove a desired number of the elements severed from the bar simultaneously and independently of the position of the cutting device which means include a device actuated by the driving shaft to lift said elements off the carriage by the vertical movement from below and to displace and lower said elements onto other supporting means.

5. In an apparatus for cutting bricks, tiles and the like, means to support a plastic bar on being expressed through a die, a cutting device with one cutting member, means to operate said cutting device, a carriage upon which said cutting device is mounted adapted to move with the same speed as the expressed bar during the cutting action, means to impart motion to said carriage for shifting every element severed from said bar after the cutting action is completed to form a narrow gap between said element and the bar, means to return the cutting device through said gap into the operative position, means to remove the elements severed from the bar from the carriage, a driving shaft adapted to actuate the aforementioned means, a friction coupling, one coupling part of which being rotatably mounted on the driving shaft and rotated by driving means, the other coupling part being fixed to the driving shaft, and means operatively connected to the expressed bar to influence the slip of the coupling parts in accordance with the speed of said bar.

6. In an apparatus for cutting bricks, tiles and the like, means to support a plastic bar on being expressed through a die, a cutting device with one cutting member, means to operate said cutting device, a carriage upon which said cutting device is mounted adapted to move with the same speed as the expressed bar during the cutting action, means to impart motion to said carriage for shifting every element severed from said bar after the cutting action is completed to form a narrow gap between said element and the bar, means to return the cutting device through said gap into the operative position, means to remove the elements severed from the bar from the carriage, a driving shaft adapted to actuate the afore mentioned means, an expanding ring operatively connected to said driving shaft and forming part of a friction coupling, another friction coupling part rotatably mounted on said driving shaft and frictionally connected to that ring, and means operatively connected to the expressed bar influencing the expansion of said ring and thereby the slip of the friction coupling parts in accordance with the speed of said bar.

In testimony that I claim the foregoing as my invention, I have signed my name.

ERNST FREY.